United States Patent
Kelly et al.

(10) Patent No.: US 6,769,663 B2
(45) Date of Patent: Aug. 3, 2004

(54) VOID FORMING AND ANCHOR POSITIONING APPARATUS AND METHOD FOR CONCRETE STRUCTURES

(75) Inventors: David Lawrence Kelly, Sacramento, CA (US); Stephen Lee Miller, Grass Valley, CA (US); Richard L. Miller, Meadow Vista, CA (US)

(73) Assignee: Meadow Burke Products, Sacramento, CA (US)

( * ) Notice: Subject to any disclaimer, the term of this patent is extended or adjusted under 35 U.S.C. 154(b) by 372 days.

(21) Appl. No.: 09/989,223

(22) Filed: Nov. 20, 2001

(65) Prior Publication Data

US 2002/0195537 A1 Dec. 26, 2002

Related U.S. Application Data

(60) Provisional application No. 60/300,890, filed on Jun. 25, 2001.

(51) Int. Cl.[7] .............................................. E04G 15/04
(52) U.S. Cl. ........................... 249/91; 249/96; 249/170; 52/125.5
(58) Field of Search ............................ 249/35, 91, 93, 249/94, 96, 97, 142, 170, 183; 52/125.5, 704, 707

(56) References Cited

U.S. PATENT DOCUMENTS

| | | | |
|---|---|---|---|
| 4,087,947 A | 5/1978 | Turner | 52/125 |
| 4,296,909 A | 10/1981 | Hacussler | 249/94 |
| 4,383,674 A | 5/1983 | Fricker | 249/177 |
| 4,726,562 A | 2/1988 | Courtois et al. | 249/91 |
| 4,807,843 A | 2/1989 | Courtois et al. | 249/61 |
| 4,821,994 A | 4/1989 | Fricker | 249/91 |
| 4,930,269 A | 6/1990 | Kelly et al. | 52/125 |
| 5,004,208 A | 4/1991 | Domizio | 249/91 |
| 5,014,473 A | 5/1991 | Kelly et al. | 52/125 |
| 5,094,047 A | 3/1992 | Kelly et al. | 52/125 |
| 5,535,979 A | 7/1996 | Ellis-Callow | 249/94 |
| 5,651,911 A | 7/1997 | Pennypacker | 249/94 |
| 5,792,552 A * | 8/1998 | Langkamp et al. | 428/309.9 |
| 6,082,700 A | 7/2000 | Lancelot, III et al. | 249/91 |

OTHER PUBLICATIONS

Dayton Superior, Precast–Prestressed Concrete Handbook, 1986, pp. 35–39.
Dayton Superior, Till–Up Construction Handbook, 1990, pp; 12–14, 3035.
Burke Super–Lift/III Tilt–Up System Load Data Pamphlet.

* cited by examiner

Primary Examiner—James P. Mackey
Assistant Examiner—Donald Heckenberg
(74) Attorney, Agent, or Firm—Thelen Reid & Priest LLP

(57) ABSTRACT

A void former for positioning an anchor within a concrete structure is comprised of a hollow polymeric body having first and second sections hinged together for movement between a closed condition engageable around the anchor received therebetween and an open condition in which the sections are separated at the lower portions thereof to release the anchor received therebetween. The void former is monolithically formed by injection molding and includes integrally formed latch elements on the respective sections for mutual engagement to secure the sections in the closed condition and a bridge between the sections to provide a hinged connection therebetween. In the injection molding process the sections are formed so as to be positioned in the open condition. Upon removal from the injection mold, the sections are hinged relative to one another by bending the bridge therebetween, before the polymer is fully cured. Such bending aligns the molecules of the polymeric material within the bridge to enable the bridge to serve as a hinge and sustain repeated bending.

28 Claims, 7 Drawing Sheets

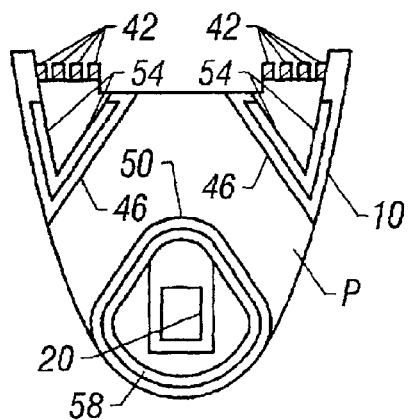
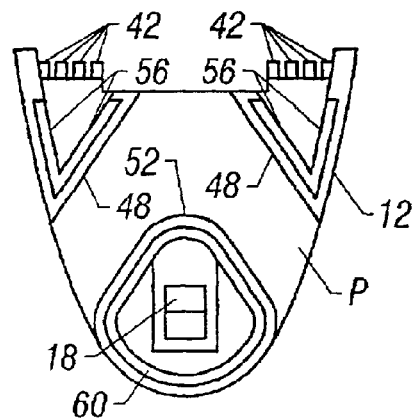
FIG. 14     FIG. 15
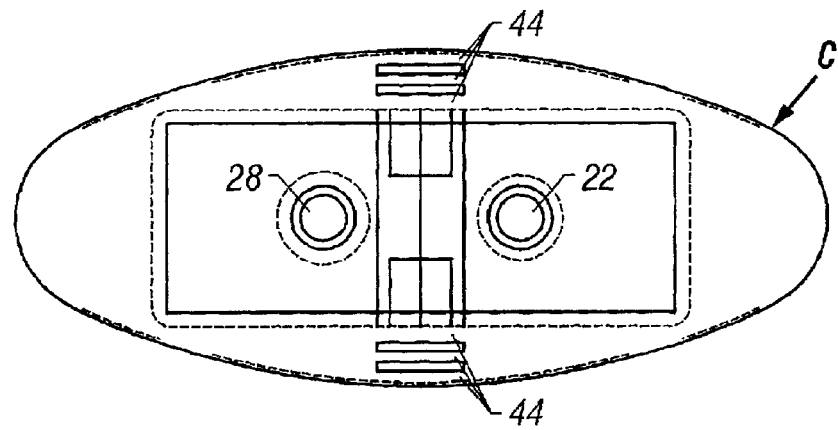
FIG. 16
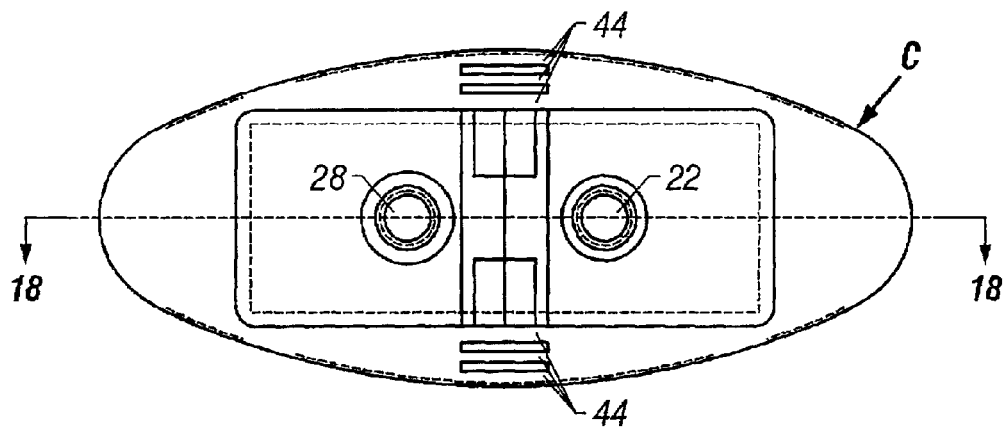
FIG. 17

VOID FORMING AND ANCHOR POSITIONING APPARATUS AND METHOD FOR CONCRETE STRUCTURES

RELATED APPLICATION

This application is based upon and claims the benefit of Provisional Application 60/300,890, filed Jun. 25, 2001.

BACKGROUND OF THE INVENTION

The present invention relates to an improved apparatus and method for placing an anchor within a concrete structure and forming a void around the anchor. It is also concerned with an improved method for forming the apparatus wherein a thin shell with hinged sections is formed with a polymeric material.

The oldest and most common void formers employ solid urethane blocks which have an undersurface of a generally arcuate configuration and a slot formed therein and extending into the undersurface for releasable receipt of the anchor to be positioned. The blocks carry protrusions which extend across the slot to releasably engage the anchor. In use, the block is plastically deformed to engage and disengage the anchor. A recent variation of such an anchor wherein the slot is narrowed and defines a passage complimental with the shape of the anchor is seen in U.S. Pat. No. 6,082,700. Earlier examples are found in U.S. Pat. No. 4,383,674, 4,821,994, 5,535,979 and 5,651,911.

It is also well known in the art to provide hollow void formers for positioning anchors wherein the void formers have a smooth arcuate undersurface with a slot formed therein for receipt of the anchor. Such void formers, however, are relatively rigid and require some type of separate retaining element to secure the anchor within the slot. An example of such a void former can be found in U.S. Pat. No. 5,094,047.

A disadvantage of the solid block prior art void formers is that they are relatively expensive and have a surface of little lubricity. A disadvantage of the prior art hollow void formers is that they too are relatively expensive and require a separate anchor retaining element.

SUMMARY OF THE INVENTION

In its broadest aspects, the apparatus of the invention comprises a hollow body having first and second sections hinged together for movement between a closed condition engageable around an anchor received therebetween and an open condition in which the sections are separated to release an anchor received therebetween. A latch is disposed between the sections to releasably secure them in the closed condition. A passage for an anchor is defined between the first and second sections.

The method of embedding a lifting anchor in a concrete structure according to the invention comprises providing a polymeric hollow body having a first and second sections hinged together at their upper portions for movement between a closed condition engageable around an anchor received therebetween and an open condition in which the sections are separated to release an anchor received therebetween. The sections define a passage therebetween for receipt and retention of a lifting anchor and are provided with a latch to selectively secure the sections together. In the method, the sections are moved apart to receive the anchor and then moved together to secure the anchor in place. As so conditioned, the void former is cast in place within a concrete structure and, ultimately, removed from the structure by spreading the first and second sections apart and releasing them from the anchor.

The method of forming the void former comprises providing a mold for injection molding a polymeric material into a body having first and second sections joined by a bridge therebetween and then removing the body from the mold and hinging the sections relative to one another through bending of the bridge, before the polymer is fully cured. In the preferred embodiment, the sections are molded in a condition where the first and second sections are separated and hingedly connected by the bridge. This enables a protruding latching device to be formed between the sections. After removal of the body from the form, and before the polymer has fully cured, the bridge is bent to alter its molecular structure and facilitate it for repeated usage as a hinge.

A principal object of the invention is to provide an improved void former of the type described comprised of a hollow polymeric shell having sections which are hingedly interconnected and provided with a latch to reasonably secure them in complemental engagement.

Another object of the invention is to provide a method of forming such a void former and the hinge and latch structure thereof as a unitary monolithic structure.

Still another and more specific object of the invention is to provide a void former comprised of hingedly interconnected hollow elements formed of polymeric material having a lubricious surface.

Still another and more general object of the invention is to provide such a void former which is relatively inexpensive to manufacture and has increased longevity, as compared to prior art void formers.

Yet another object of the invention is to provide such a void former which is easier to use than prior art void formers both in its installation and removal.

These and other objects will become more apparent from the accompanying drawings and the following detail description.

BRIEF DESCRIPTION OF THE DRAWINGS

FIG. 14 is an end view of one of the opposed sections of the shell showing the structure thereof which complimentally meets with the other section upon movement of the sections to the closed condition, with a cross-section shown through bridging hinge elements;

FIG. 15 is an end view of the other of the opposed sections of the shell showing the structure thereof which complimentally meets with the other section upon movement of the sections to the closed condition, with a cross-section shown through bridging hinge elements.

FIG. 16 is a top plan view of the cap for the void former;

FIG. 17 is a bottom plan view of the cap for the void former;

DESCRIPTION OF THE PREFERRED EMBODIMENT

Figure 1:
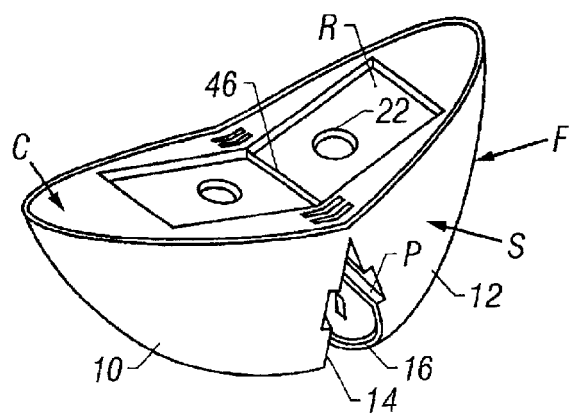
FIG. 1 is a perspective view of the inventive void former, shown with the opposed sections thereof separated.
Figure 2:
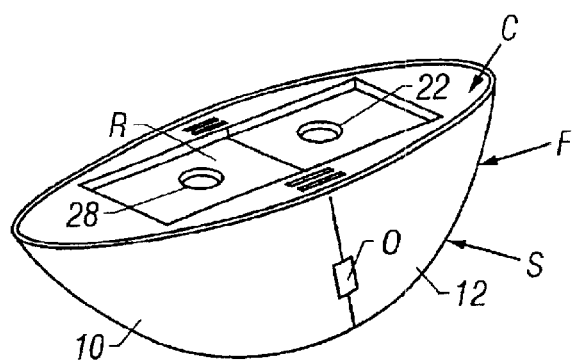
FIG. 2 is a perspective view of the void former shown with the opposed sections thereof mutually engaged.

Referring now to FIG. 1, the void former is designated therein in its entirety by the letter F, and is shown as comprising a bottom shell S, and a cap C. The shell S comprises first and second sections 10 and 12, respectively, joined at their upper portions by a hinge for movement between the open condition shown in FIG. 1 and the closed condition shown in FIG. 2. In the closed condition, the first and second sections meet to define a smooth undersurface, as shown in FIG. 2. In the open condition, the first and second sections are separated at the lower portion thereof into the bifurcated configuration shown in FIG. 1.

Figure 3:
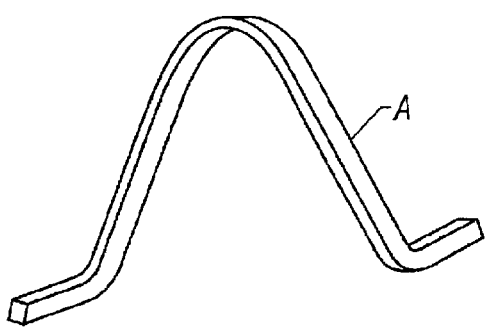
FIG. 3 is a perspective view of one type of anchor which may be used with the void former of the invention.
Figure 4:
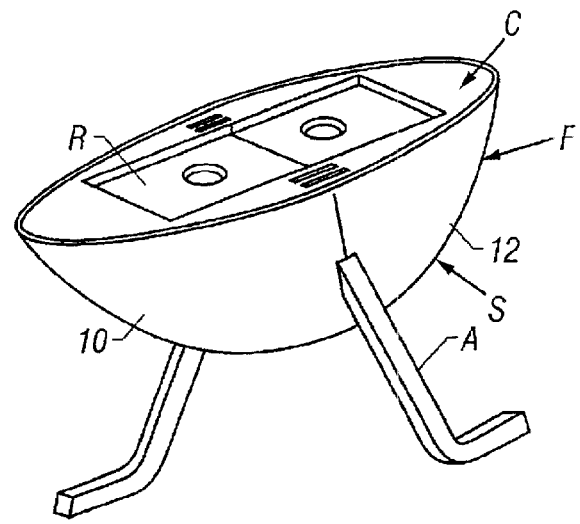
FIG. 4 is a perspective view of the void former, shown with the FIG. 3 anchor in place and the opposed sections engaged therearound.

The sections 10 and 12 meet at edge surfaces 14, 16 when in the closed condition shown in FIG. 2. They define therebetween a passage P for receipt of an anchor A (FIGS. 3 and 4). With the sections 10, 12 in the closed condition shown in FIG. 2, openings O extend through opposite sides of the arcuate undersurface of the void former. When the anchor A is in place within the void former and the sections 10, 12 are closed, as seen in FIG. 4, the legs of the anchor A extend through the openings O.

Figure 7:
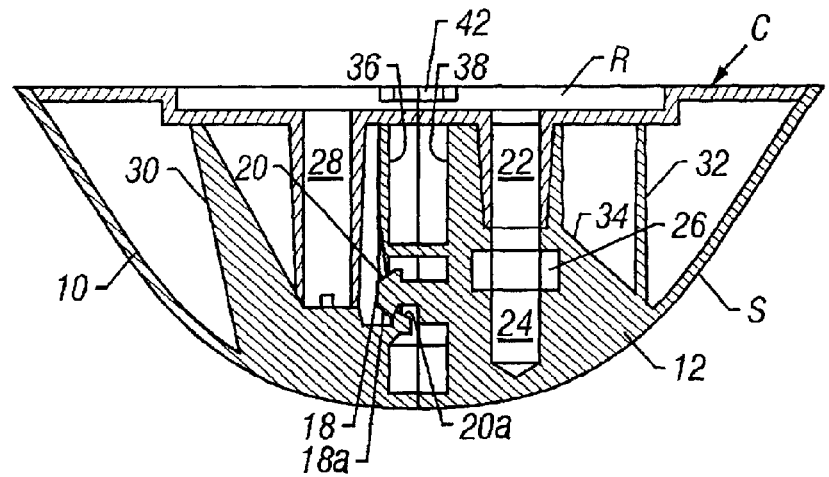
FIG. 7 is a cross-sectional view of the void former, taken on line 7—7 of FIG. 5.
Figure 8:
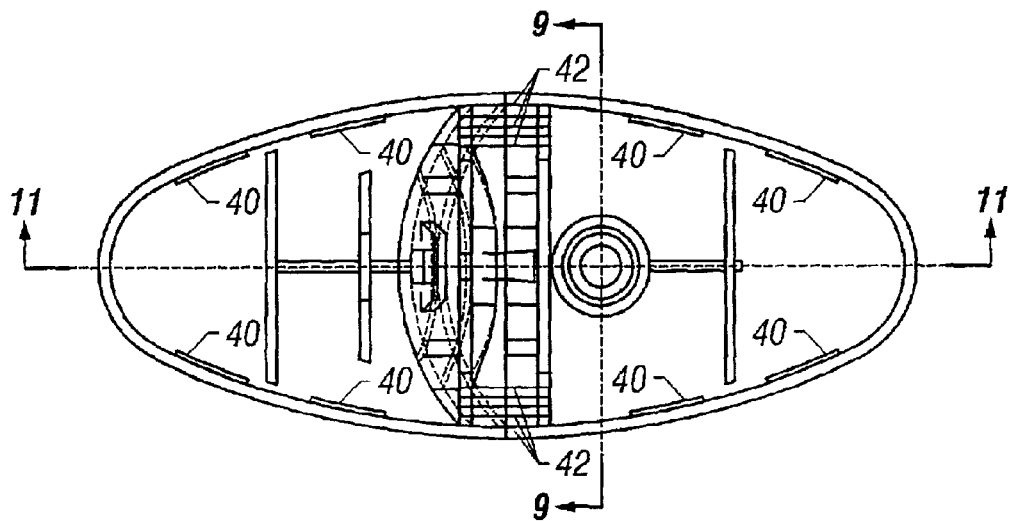
FIG. 8 is a plan view of the bottom shell of the void former.
Figure 9:
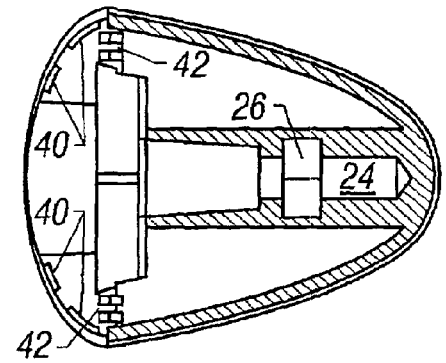
FIG. 9 is a cross-sectional view of the shell, taken on line 9—9 of FIG. 8.

The internal construction of the bottom shell S with cap C in place thereon, is shown in FIG. 7. As there seen, the shell is latched in closed condition by a catch 18 carried by the section 12 engaged with an opening 20 formed in the section 10. The catch 18 and opening 20 are formed with inclined cam surfaces 18a and 20a, respectively which snap over one another to enable the sections 10 and 12 to move between the latched and unlatched conditions. A first bore 22 extends through the cap C in aligned communication with a second bore 24 in the section 12 for receipt of an anchor bolt (not illustrated) which may be used to secure the void former to the surface of a form. A third bore 28 is formed in the cap C for receipt of the holding dowel of an anchor plate (not illustrated). Such an anchor plate would be received in recess R formed in the top of the cap C and would typically have two dowels, one of which would be received in the bore 22 and the other in the bore 28. The provision of anchor bolts, holding plates and dowels is not unique to the present invention and may be seen, for example, in prior U.S. Pat. No. 4,821,994.

The interior of the shell S is formed with webs 30, 32, 34, 36 and 38 which serve to reinforce the shell and locate the components molded therein. When the cap C is in place on the shell, as seen in FIG. 7, it rests on the webs 30, 32, 36 and 38 and the walls of the bore 28 engage and are located by the web 30. With the cap so in place, tabs 40 (see FIGS. 8, 9, 10, 11 and 13) extending slightly inwardly from the top edge of the shell 26 are engaged over the cap C to hold it in place.

Bridge elements 42 are integrally formed with the shell S to join the first and second sections 10, 12 at the upper portion of the shell. Three such bridge elements are formed on each side of the shell (see FIG. 8) in spaced relationship to one another. These sections are rectangular cross-section and measure approximately 0.09×0.09 inches, with a spacing of approximately 0.09 inches between adjacent elements, except for the adjacent innermost elements which have a spacing of approximately 2 inches from each other to provide a large uninterrupted space therebetween. The cap has bridge elements 44 which join the sides thereof extending over the sections 10 and 12 of the shell. The bridge elements 44 are shaped and proportioned to interdigitate with the bridge elements 42 when the cap is in place. An open separation line 46 (see FIG. 1) extends between the innermost bridge elements 44.

The bridge elements 42, 44 serve as a hinge to secure the sections 10, 12 for movement between the open and closed positions shown in FIG. 1 and 2. When moving between these positions, the catch 18 and opening 20 of the latch snap in and out of the engaged and disengaged conditions see in FIGS. 7 and 11, respectively.

FIGS. 14 and 15 illustrate the ends of the sections 10 and 12, respectively, which complimentally meet to define the passage P. As there seen, the upper walls of the passage are designated 46 in the section 10 and 48 in the section 12 and the lower walls of the passage are designated 50 in the section 10 and 52 in the section 12. Recesses 54 and complimental protrusions 56 are formed on sections above the upper walls 46, 48, respectively. A recess 58 and complimental protrusion 60 are formed beneath the lower walls 50, 52, respectively. The recesses 58 and 60 are of a generally ovoid configuration, as viewed from the end in FIGS. 14 and 15. When the sections 10 and 12 are in the closed condition, the recesses and protrusions serve as guide elements and complimentally nest together to maintain the sections in alignment.

Figure 5:
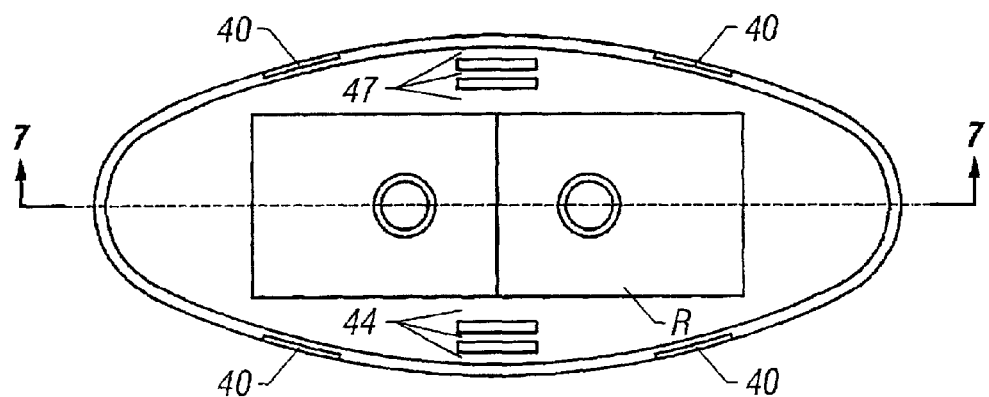
FIG. 5 is a top plan view of the void former.
Figure 6:
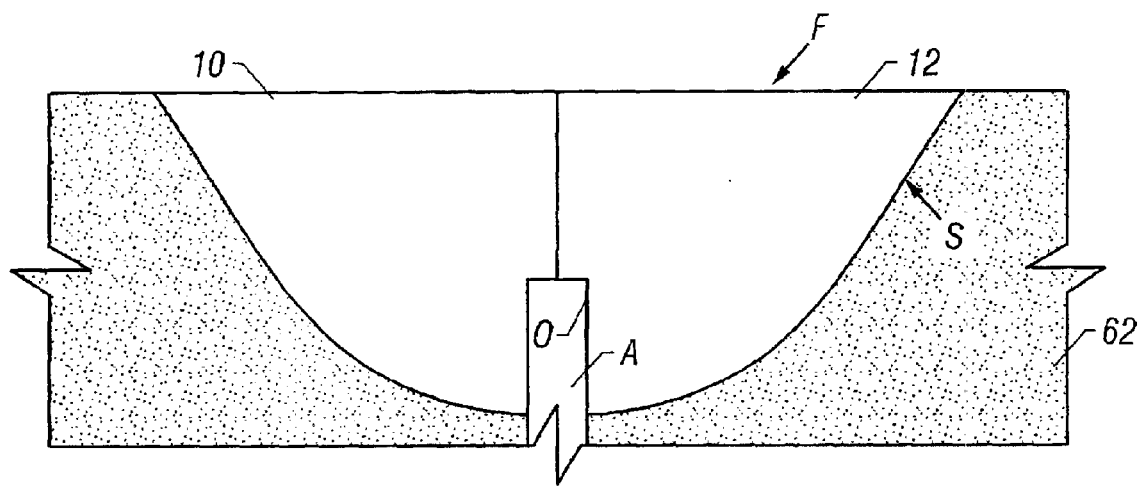
FIG. 6 is a side elevational view of the void former, engaged around an anchor and shown in place in a concrete structure.

The dimensions of the void former vary, depending upon the size of the anchor and lifting bail with which the former is intended to be used. Representative outside dimensions for an insert designed for use with a large anchor are: length-8.45 inches; width-3.4 inches; depth-3.25 inches. The wall thickness of the shell and cap is approximately 0.12 inches. The radius of the undersurface of the void former in this example would be approximately 3.4 inches. This radius extends up 60 degrees from the vertical center line of the void former on either side and merges with a generally tangential surface which extends to the top of the void former (FIGS. 5 and 6). Although the material from which the void former is formed may be any suitable resilient polymer, polypropylene copolymer, reprocessed, is preferred. Other possibilities for example, are: styremic copolymer (i.e. Phillips 66 KRATON); polyester elastomer (i.e.. DuPont HYTREL); polyethelene, low and hi density; toughened 66 nylon; polyurethane; polyether block amide (i.e. Autofina PEBAX); styrene butadiene copolymer (i.e. K resin); flexible PVC; EPDM Rubber; and polypropylene homopolymer reprocessed.

FIG. 6 shows the void former cast in place within a concrete structure 62, with the anchor A embedded within the structure. As there shown, the sections 10, 12 of the void former F are in complimental engagement and capture the anchor A therebetween. Once the concrete structure has sufficiently cured, the void former may be removed by swinging the sections 10, 12 upwardly about the hinge provided by the bridge elements 42, 44. Such swinging may be achieved by inserting rods into the bores 22 and 28 and then moving these rods toward one another to spread the sections 10, 12 into the condition shown in FIGS. 10 and 11, thus releasing the catch. Once the sections are spread to fully disengage the catch 18 from beneath the anchor A, the void former may be easily removed from the concrete structure, leaving a clean void around the anchor.

Figure 10:
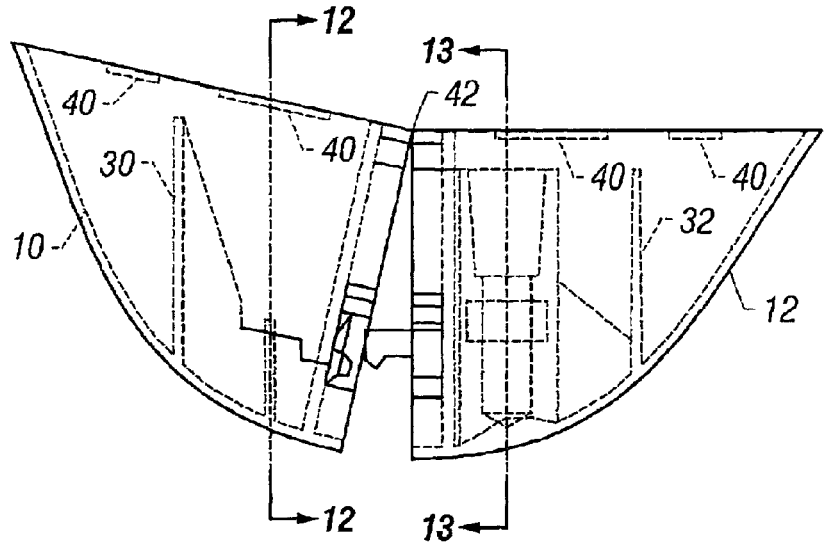
FIG. 10 is a side elevational view of the bottom shell of the void former, with the opposed sections thereof hingedly separated.
Figure 11:
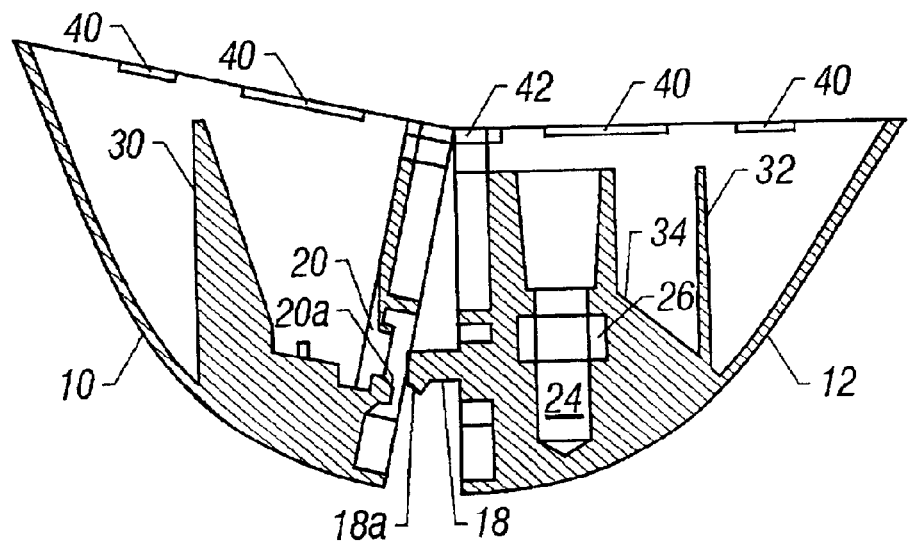
FIG. 11 is a cross-sectional view of the shell, taken on line 11—11 of FIG. 8.
Figure 12:
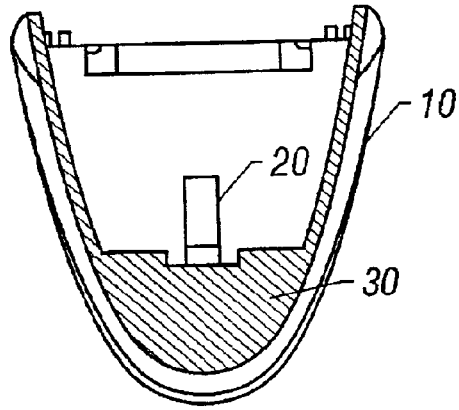
FIG. 12 is a cross-sectional view of the shell, taken on line 12—12 of FIG. 10.
Figure 13:
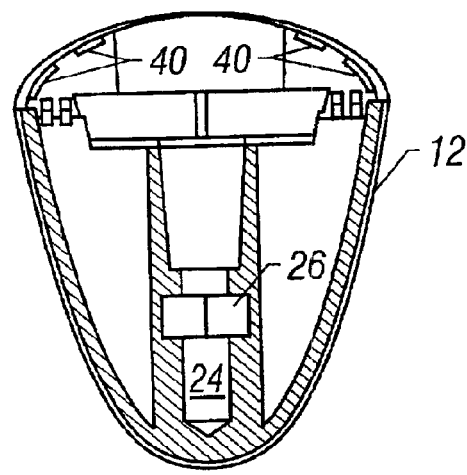
FIG. 13 is a cross-sectional view of the shell, taken on line 13—13 of FIG. 10.
Figure 18:
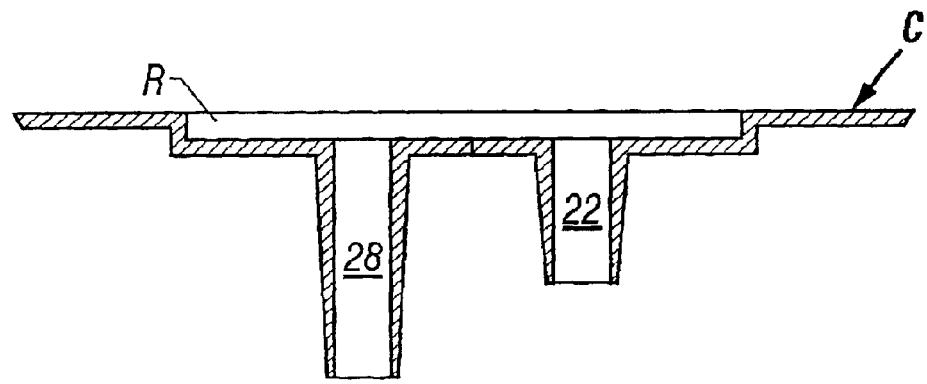
FIG. 18 is a cross-sectional view of the cap, taken on line 18—18 of FIG. 17.
Figure 19:
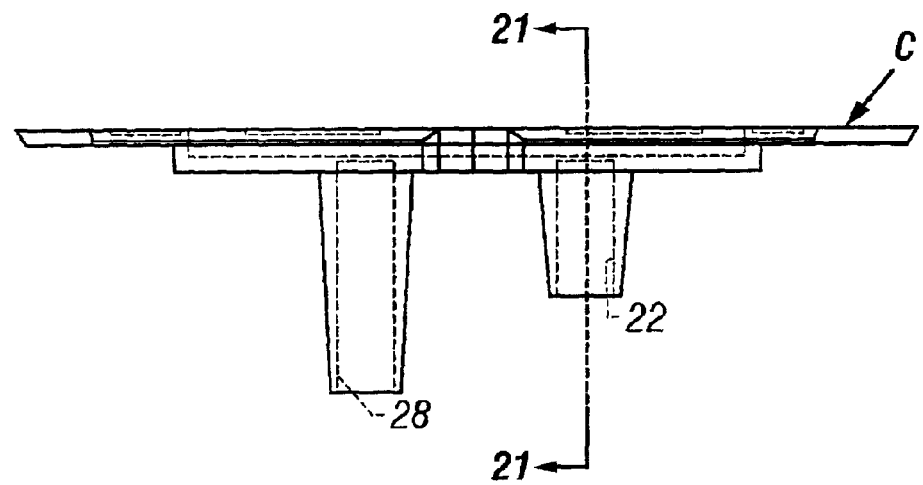
FIG. 19 is a side elevational view of the cap.
Figure 20:
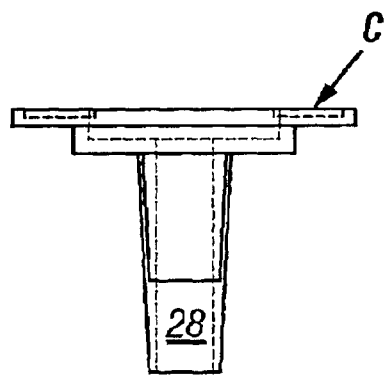
FIG. 20 is an end elevational view of the cap.
Figure 21:
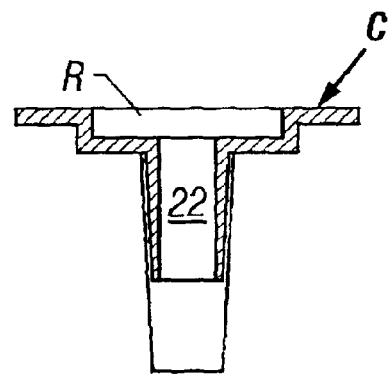
FIG. 21 is a cross-sectional view of the cap, taken on line 21—21 of FIG. 19.

The bottom shell of the void former is injected molded with a mold having portions for the sections 10 and 12 disposed in a configuration corresponding generally to the open configuration shown in FIGS. 10 and 11. Such configuration enables the catch 18 to be formed and removed from the mold. As the part is removed, the sections 10 and 12 are pivoted relative to one another about the hinge provided by the bridges 42. Such hinging of the sections by bending of the bridges before the molded part is fully cured serves to alter the molecular structure of the bridges so that they may be repeatedly hinged back and forth, without fatiguing. Molding the sections 10 and 12 in the open condition also makes the bridges 42 serve to normally bias the sections to this condition.

The cap C is injected molded in a flat configuration corresponding to the position which the cap ultimately assumes when the void former is in the closed condition. Ideally, after being removed from the mold, the sections of the cap are hinged about the bridge element 42 before the polymeric material has completed cured. This also serves to rearrange the molecules in the bridge elements 44 to ideally suit them for repeated hinging without fatigue.

After the shell and cap are molded, the cap is snapped into place on the shell, so as to assume the condition shown in FIG. 7. In this condition, the tabs 40 of the shell engage over the outer edges of the cap to hold the cap in place. Recesses (not illustrated) in the edge of the cap are provided to receive the tabs 40.

Figure 22:
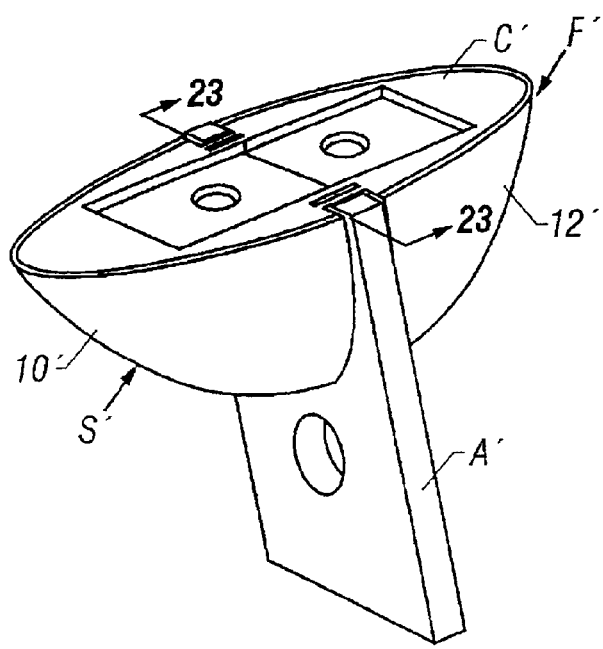
FIG. 22 is a perspective view of a modified form of the void former adapted to accommodate a flat anchor, with the anchor shown in place and the opposed sections of the void former and engaged therearound.
Figure 23:
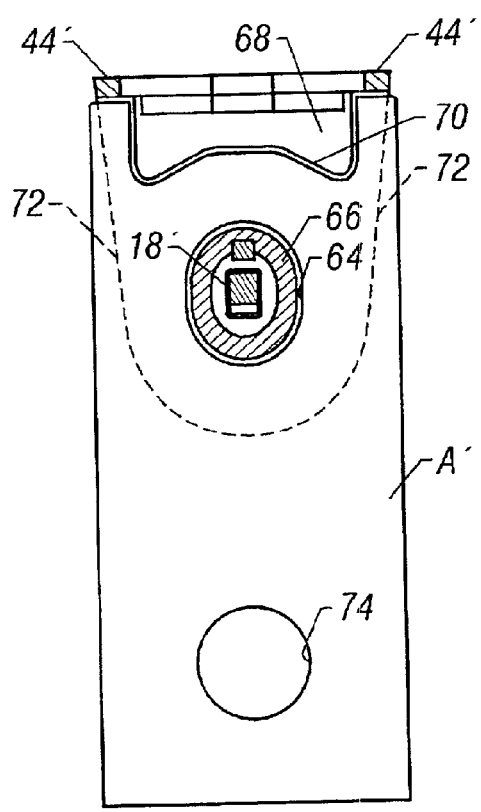
FIG. 23 is a cross-sectional view of the void former, taken on line 23—23 of FIG. 22, showing the flat anchor in place.
Figure 24:
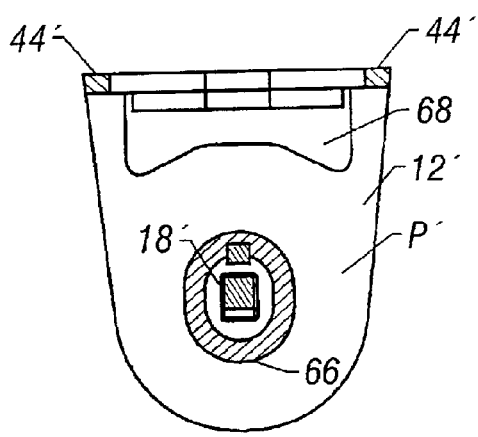
FIG. 24 is a cross-sectional view similar to FIG. 23, with the flat anchor removed.

The modified void former shown in FIGS. 22 to 24 corresponds to that previously described, except that it is designed to accommodate a flat anchor A'. The components of the FIGS. 22 to 23 embodiment corresponding to those of the FIGS. 1 to 21 embodiment are designated by like letters and numerals, followed by a prime mark, as follows: cap C'; void former F'; bottom shell S'; first section 10'; second section 12'; catch 18'; and bridge elements 44'. Although not shown in detail and designated by identifiers, it should be understood that the remaining construction of the FIGS. 22 to 24 embodiment corresponds to that of the FIGS. 1 to 21 embodiment.

The modified embodiment of FIGS. 22 to 24 differs from that of FIGS. 1 to 21 primarily in that the passage P' opens through the full circumference of the shell S' to accommodate the flat anchor A'. When in place within the void former, an opening 64 through the anchor A' accommodates passage of the catch through the anchor. The catch 18' engages an opening (not illustrated) corresponding to the opening 20 to hold the shell sections 10' and 12' in the closed condition engaged around the anchor A', as seen in FIG. 22. Bosses 66, 68 are formed on the shell section 12' and extend through the anchor A' when it is engaged between the shell sections 10', 12'. The upper end of the anchor A' is formed with a recess 70 which complimentally receives the boss 68 and has ears 72 disposed to either side of the boss to hold the anchor A' against rotation relative to the void former.

As shown, the lower portion of the rectangular plate anchor A' is of a generally rectangular configuration and has an opening 74 extending there through for receipt of a rebar. Other configurations of the flat plate anchor may also be accommodated by the modified embodiment of FIGS. 22 to 24.

CONCLUSION

The void former of the present invention is designed for repeated use. Each time it is removed from a concrete structure, leaving the anchor A, A' in place, it may be conditioned for reuse by simply inserting a new anchor into the passage P, P' while the sections 10, 10' and 12, 12' are in the open condition and then snapping the sections back together around the anchor to reengage the catch 18. The smooth lubricious surface the void former ideally suits it for easy removal from the concrete structure and reuse, since concrete does not adhere to the surface.

From the foregoing detailed description it is believed apparent that the present invention enables to the entailment of the objects initially set forth herein. It should be understood, however, that the invention is not intended to be limited to the specifics of the described embodiment, but rather is defined by the accompanying claims.

What we claim:

1. An apparatus for use in embedding an anchor in a concrete structure, comprising:
   (a) a body having first and second sections hinged together at upper portions thereof for movement between a closed condition engagable around an anchor received therebetween and an open condition in which said sections are separated to release an anchor received therebetween;
   (b) a latch disposed between said sections to releasably secure the sections in the closed condition; and,
   (c) a passage defined between the first and second sections and opening through an undersurface of the body, said passage being adapted to receive and retain an anchor therein when in the sections are in the closed condition and, upon movement of the first and second sections to the open condition, being disposed to release an anchor received therein from the body.

2. An apparatus according to claim 1 wherein the latch is disposed beneath the upper portions of the sections.

3. An apparatus according to claim 1 wherein the body is hollow and formed of flexible polymeric material and comprises a monolithic shell defining the first and second sections and a cap secured over the shell to provide a closure therefor.

4. An apparatus according to claim 1 wherein the latch comprises a protruding catch integrally formed with the first section and an opening integrally formed with the second section for latching engagement with the catch when the sections move from the open condition to the closed condition.

5. An apparatus according to claim 4 wherein the catch and opening include mating surfaces which assume an engaged condition to secure the sections in the closed condition and cam apart to release the latch upon applying force to the body to move the sections to the open condition.

6. An apparatus according to claim 3 wherein the hinge comprises first bridge elements monolithically formed with and extending between upper portions of the first and second sections.

7. An apparatus according to claim 6 wherein:
  (a) the cap comprises separated sections disposed over the first and second sections of the shell; and,
  (b) the hinge further comprises second bridge elements integrally formed with and extending between the separated sections.

8. An apparatus according to claim 7 wherein the first bridge elements interdigitate with the second bridge elements.

9. An apparatus according to claim 3 wherein the flexible polymeric material comprises polypropylene copolymer, reprocessed.

10. An apparatus according to claim 3 wherein the flexible polymeric material comprises a polymer selected from the group consisting of styremic copolymer, polyesther elastomer, polyethelene, nylon, polyurethane, polyether block amide, styrene butadiene copolymer, EPDM rubber and polypropylene copolymer, reprocessed.

11. An apparatus according to claim 1 wherein the first and second sections carry guide elements which mutually engage when the sections move to the closed condition to maintain the sections in alignment.

12. In combination with an anchor for lifting a concrete structure, an improved apparatus for placing the anchor in a form for the structure and forming a void partially therearound, said apparatus comprising:
  (a) a body having first and second sections hinged together at upper portions thereof for movement between a closed condition in which said sections engage around the anchor and an open condition in which said sections are separated at the lower portion thereof to release the anchor;
  (b) a latch disposed between said sections to releasably secure the sections in the closed condition; and,
  (c) a passage defined between the sections, said passage complimentally receiving the anchor and opening through an undersurface of the body to permit the anchor to extend from the undersurface, said body, upon movement of the first and second sections to the open condition, being disposed to release the anchor from the body.

13. An apparatus according to claim 12 wherein the latch is disposed, at least in part, beneath the passage.

14. An apparatus according to claim 12 wherein the body is hollow and formed of flexible polymeric material and comprises a monolithic shell defining the first and second sections and a cap secured over the shell to provide a closure therefor.

15. An apparatus according to claim 12 wherein the latch comprises a protruding catch integrally formed with the first section and an opening integrally formed with the second section for latching engagement with the catch when the sections move from the open condition to the closed condition.

16. An apparatus according to claim 15 wherein the catch and opening include mating surfaces which assume an engaged condition to secure the sections in the closed condition and cam apart to release the latch to upon applying force to the body to move the sections to the open condition.

17. An apparatus according to claim 14 wherein the hinge comprises first bridge elements monolithically formed with and extending between upper portions of the first and second sections.

18. An apparatus according to claim 17 wherein:
  (a) the cap comprises separated sections disposed over the first and second sections of the shell; and,
  (b) the hinge further comprises second bridge elements integrally formed with and extending between the separated sections.

19. An apparatus according to claim 18 wherein the first bridge elements interdigitate with the second bridge elements.

20. An apparatus according to claim 14 wherein the flexible polymeric material comprises polypropylene copolymer, reprocessed.

21. An apparatus according to claim 14 wherein the flexible polymeric material comprises a polymer selected from the group consisting of styremic copolymer, polyesther elastomer, polyethelene, nylon, polyurethane, polyether block amide, styrene butadiene copolymer, EPDM rubber and polypropylene copolymer, reprocessed.

22. An apparatus according to claim 12 wherein the first and second sections carry guide elements which mutually engage when the sections move to the closed condition to maintain the sections in alignment.

23. An apparatus according to claim 12, wherein:
  (a) the anchor is an angle shape having apex received within the passage above the latch and legs extending to either side of the latch.

24. An apparatus according to claim 12 wherein the anchor is of a generally plate-shaped configuration having a portion complimentally received within an upper portion of the passage and an opening extending therethrough through which latch extends when the sections are in the closed condition.

25. An apparatus according to claim 1 wherein the latch comprises mutually engagable surfaces integrally formed, respectively, with the first and second sections for latching engagement with one another when the sections move from the open condition to the closed condition.

26. An apparatus according to claim 1 wherein the latch comprises mutually engagable elements carried by the respective sections, said elements having mating surfaces which engage one another to secure the sections in the closed condition, and cam apart to release the latch upon applying force to the body to move the sections to the open condition.

27. An apparatus according to claim 12 wherein the latch comprises mutually engagable surfaces integrally formed, respectively, with the first and second sections for latching engagement with one another when the sections move from the open condition to the closed condition.

28. An apparatus according to claim 12 wherein the latch comprises mutually engagable elements carried by the respective sections, said elements having mating surfaces which engage one another to secure the sections in the closed condition, and cam apart to release the latch upon applying force to the body to move the sections to the open condition.

* * * * *